US009960676B1

(12) United States Patent
Symonds

(10) Patent No.: US 9,960,676 B1
(45) Date of Patent: May 1, 2018

(54) LOAD SHARING BETWEEN PARALLEL CONNECTED POWER CONVERTERS

(71) Applicant: Excelitas Technologies Corp., Waltham, MA (US)

(72) Inventor: Neil Symonds, Julian, CA (US)

(73) Assignee: Excelitas Technologies Corp., Waltham, MA (US)

( * ) Notice: Subject to any disclaimer, the term of this patent is extended or adjusted under 35 U.S.C. 154(b) by 0 days. days.

(21) Appl. No.: 15/340,067

(22) Filed: Nov. 1, 2016

(51) Int. Cl.
*H02M 3/158* (2006.01)
*H02M 3/157* (2006.01)
*H02M 1/00* (2006.01)
*H02M 3/156* (2006.01)

(52) U.S. Cl.
CPC .................................. *H02M 3/156* (2013.01)

(58) Field of Classification Search
CPC ............... H02M 3/158; H02M 3/1584; H02M 2003/1586; H02M 3/1588; H02M 3/157; H02M 2001/0012
See application file for complete search history.

(56) References Cited

U.S. PATENT DOCUMENTS

| | | | | |
|---|---|---|---|---|
| 6,268,716 B1* | 7/2001 | Burstein | ............... | H02M 3/157 323/272 |
| 7,793,005 B1* | 9/2010 | Fernald | ............... | H02M 3/1584 323/222 |
| 8,710,810 B1* | 4/2014 | McJimsey | ........... | H02M 3/1584 323/272 |
| 2003/0035308 A1* | 2/2003 | Lynch | ........ | H02J 3/18 363/34 |
| 2004/0189251 A1* | 9/2004 | Kutkut | ..... | H02J 7/022 320/128 |
| 2006/0239046 A1* | 10/2006 | Zane | ........ | H02J 1/102 363/65 |
| 2012/0169311 A1* | 7/2012 | Malmberg | .............. | H02J 1/102 323/272 |
| 2014/0097818 A1* | 4/2014 | Wiktor | .................. | H02M 3/156 323/283 |
| 2017/0179822 A1* | 6/2017 | Kobayashi | ............ | H02M 3/158 |
| 2017/0237349 A1* | 8/2017 | Labib | .................... | H02M 3/158 323/271 |

OTHER PUBLICATIONS

Jordan, Mark; Texas Instruments Incorporated; UC3907 Load Share IC Simplifies Parallel Power Supply Design, 1999.

* cited by examiner

*Primary Examiner* — Timothy J Dole
*Assistant Examiner* — Sisay G Tiku
(74) *Attorney, Agent, or Firm* — Peter A. Nieves; Sheehan Phinney Bass & Green PA

(57) ABSTRACT

A power supply system includes multiple power converters, each having an input and an output. The outputs of the power converters are connected together in parallel to produce a single system output. There is a shared command bus that is coupled to each one of the power converters. A control loop in (associated with) a designated one of the power converters is operable to generate a current command signal to be output onto the shared command bus. All of the parallel connected power converters in the power supply system are configured to receive the current command signal from the shared command bus and to adjust an amount of electrical current being supplied by that power converter in response to the current command signal.

25 Claims, 6 Drawing Sheets

LOAD SHARING BETWEEN PARALLEL CONNECTED POWER CONVERTERS

FIELD OF THE INVENTION

This disclosure relates to parallel connected power converters and, more particularly, relates to load sharing between parallel connected power converters.

BACKGROUND

Certain control systems/techniques for connected power converters (e.g., ones based on single wire current share technology) may use an auxiliary control loop having a bandwidth lower than a main voltage regulation loop to force load sharing. In some instances, this lower bandwidth may not allow for accurate current sharing during load transients, which may cause one or more of the power converters to go into a current limiting state, for example, resulting in excessive sag of the output voltage.

Other control systems systems/techniques for connected power converters (e.g., ones based on droop current sharing technology) may rely on each power converter having a finite output resistance to force current sharing. Accuracy of current sharing in such instances may rely on the no-load output voltage of each converter being accurately matched. The no-load output voltages may drift with time and temperature, resulting in inaccurate load current sharing. Also, the droop characteristics may tend to degrade the output voltage regulation.

Still other control systems/techniques for connected power converters may rely on tying error amplifier outputs together so that their current commands are common. This may work well in some instances (e.g., provided that the error amplifiers are physically close and operate in a relatively noise-free environment), because the error amplifier signals generally operate at the full bandwidth of the power converters, but any offset or noise may be converted directly into differences in output current.

SUMMARY OF THE INVENTION

In one aspect, a power supply system includes multiple power converters, each having an input and an output. The outputs of the power converters are connected together in parallel to produce a single system output. There is a shared command bus that is coupled to each one of the power converters. A control loop in (associated with) a designated one of the power converters is operable to generate a current command signal to be output onto the shared command bus. All of the parallel connected power converters in the power supply system are configured to receive the current command signal from the shared command bus and to adjust an amount of electrical current being supplied by that power converter in response to the current command signal.

In a typical implementation, a system may have one primary master power converter, one or more (optional) secondary or backup master power converters, and one or more slave power converters. Generally speaking, the primary master power converter drives the shared command bus unless that power converter becomes faulty, the (optional) secondary or backup master power converter will take over the task of driving the shared command bus if the primary master power converter becomes faulty, and any slave power converters never drive the shared command bus.

In some implementations, one or more of the following advantages are present.

For example, in a typical implementation, the system disclosed herein advantageously is able to maintain a highly regulated output voltage, particularly in the presence of transients in line voltage or load current. Moreover, the system is generally able to control the output current very effectively from each respective one of the power converters in the system so that they share the total load current equally. The system has a very good load sharing transient response, particularly as compared to prior art parallel-connected power converter systems. Moreover, in some implementations, particularly where there is a designated secondary or backup master converter, the system has built-in redundancy, so that failure of a primary master power converter, for example, or perhaps any one of the other parallel-connected power converters, can be tolerated as long as there is sufficient current capacity available from the remaining power converters in the system. Moreover, in a typical implementation, effective load sharing can be achieved among the multiple parallel connected power converters without needing a separate control system that is external to the power converters.

Other features and advantages will be apparent from the description and drawings, and from the claims.

BRIEF DESCRIPTION OF THE DRAWINGS

Like reference characters and identifiers in the drawings refer to like elements.

DETAILED DESCRIPTION

Figure 1:
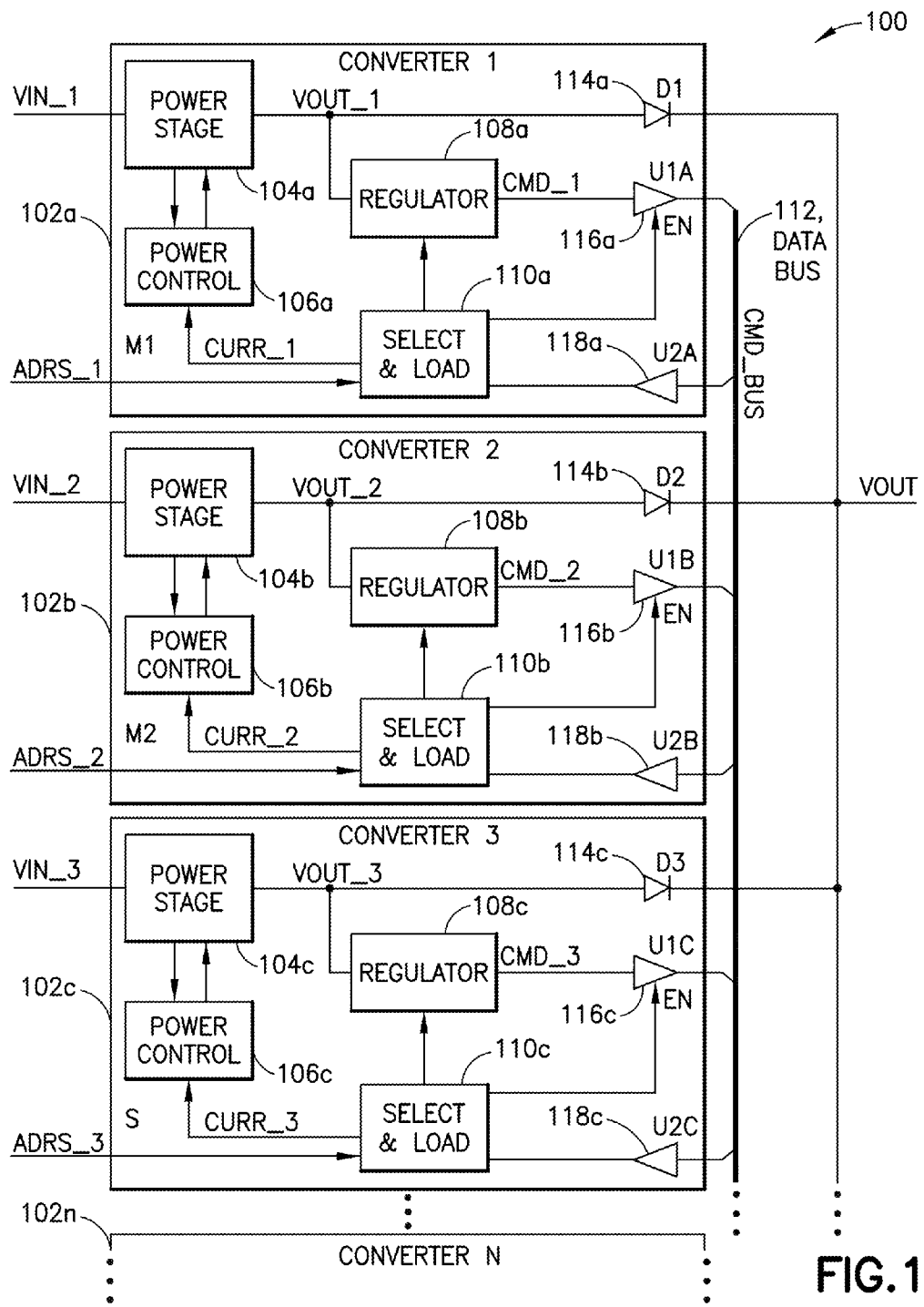
FIG. 1 is schematic diagram showing an exemplary power supply system that includes multiple power converters connected in parallel.

FIG. 1 is schematic diagram showing an exemplary power supply system 100 with multiple power converters 102a, 102b, 102c, . . . 102n, each of which is generally configured to convert electric energy from one form to another.

In the illustrated implementation, each power converter 102a, 102b, 102c, . . . 102n has a main input (where it receives an input voltage VIN_1, VIN_2, VIN_3, . . . VIN_n), and a main output (to which it outputs an output voltage VOUT_1, VOUT_2, VOUT_3, . . . VOUT_n). The main outputs of the parallel power converters in the illustrated implementation are connected together in parallel through isolation diodes 114a, 114b, 114c, . . . 114n to produce a single system output voltage VOUT.

Each power converter 102a, 102b, 102c, . . . 102n in the illustrated implementation has a buffered command output and a buffered command input. A shared command bus 112 (CMD_BUS) is connected to the buffered command output and the buffered command input for every one of the parallel-connected power converters 102a, 102b, 102c, . . .

102*n* in the system 100. The shared command bus 112 is essentially a bus or any kind of path along which an electrical or electromagnetic signal can flow.

Each power converter 102*a*, 102*b*, 102*c*, . . . 102*n* in the illustrated implementation has a similar set of subcomponents that are connected in a similar manner.

As an example, power converter 102*a* has a power stage 104*a*, a power control circuit 106*a*, a regulator circuit 108*a*, a select and load circuit 110*a*, an output isolation diode 114*a*, a command output buffer 116*a*, and a command input buffer 118*a*. Command output buffer 116*a* has an enable input, EN, which is controlled so that only one of command output buffers 116*a*, 116*c*, 116*c*, . . . 116*n* may drive the data bus at any one time.

Power stage 104*a* is generally operable to convert its input voltage (e.g., a DC input voltage VIN_1) to a different output voltage (e.g., DC output voltage VOUT_1). In such implementations, the power stage 104*a* can utilize virtually any kind of DC-to-DC converter topology that may employ current mode control (e.g., a control scheme whereby the output current may be controlled by an input command, such as CURR_1). Some examples of suitable topologies in this regard include single-ended converters, half-bridge converters, full-bridge converters, etc., that employ current mode control.

Power stage 104*a* has an input (where it receives input voltage VIN_1) and an output (through which it outputs an output voltage VOUT_1). The input of power stage 104*a* is connected to the main input of the power converter 102*a*. The output of power stage 104*a* is connected to the power converter's 102*a* main output via the output isolation diode 114*a*. The output of power stage 104*a* is also connected to a sensing input on the regulator circuit 108*a*. The power stage 104*a* also has a control interface that is connected to the power control circuit.

The power control circuit 106*a* is configured to receive an input command CURR_1 from the select and load circuit 110*a*, and control or influence operation or behavior of the power stage 104*a*. The power control circuit 106*a* has an input that is connected to the select and load circuit 110*a*, and an output that is connected to the control interface of the power stage 104*a*.

The regulator circuit 108*a* is generally able to monitor the output voltage VOUT_1 of the power stage 104*a*, and produce a current command signal CMD_1 that may be used to control or influence the operation of (and current production by) all the parallel-connected power converters (e.g., 102*a*, 102*b*, 102*c*, . . . 102*n*) in the system 100. The regulator circuit 108*a* can be virtually any kind of regulator circuit.

The regulator circuit 108*a* has a sensing input that is connected to the output of the power stage 104*a*, a control input that is connected to the select and load circuit 110*a*, and a command output that is connected to the command output of the power converter 102*a* via the command output buffer 116*a*.

The select and load circuit 110*a* is generally able to control and/or influence the behavior of the power control circuit 106*a*, the regulator circuit 108*a*, and/or the command output buffer 116*a*. The way that the select and load circuit 110*a* performs these functions may depend at least in part on the functional designation (e.g., primary master, secondary or backup master, or slave) of its associated power converter 102*a*. In a typical implementation, a system (e.g., system 100) would include one primary master power converter, (optionally) one secondary or backup master power converter, and one or more slave power converters. For example, in the implementation represented in FIG. 1, the system 100 has one primary master power converter 102*a* (so designated by an "M1" signal being provided at a role designating input of that power converter's select and load circuit 110*a*), one secondary or backup master power converter 102*b* (so designated by an "M2" signal being provided at a role designating input of that power converter's select and load circuit 110*b*), and multiple slave power converters 102*c*, . . . 102*n* (so designated, for example, by an "S" signal being provided at a role designating input of each of those power converters' select and load circuits 110*c*, . . . 110*n*).

Generally speaking, a primary master converter (e.g., 102*a* in FIG. 1) is operable to issue commands (onto shared command bus 112) that control or influence the behavior of the other converters (e.g., 102*b*, 102*c*, . . . 102*n*) in the system 100. A secondary or backup master converter (e.g., 102*b* in FIG. 1) is operable to act as a backup for the primary master converter in the system 100 and will take over any primary master converter functionalities if, for example, the primary master converter 102*a* ceases to operate. The slave converter(s) are operable to be controlled or influenced by any commands received from the shared command bus 112 (e.g., ones that originate at a primary or secondary master converter). In a typical system (e.g., system 100) there is only one primary master power converter, there may (but need not) be a secondary or backup master power converter, and there may be multiple slave power converters.

The select and load circuit 110*a* has a role designating input that is configured to receive a role designating signal. In the illustrated implementation, select and load circuit 110*a* is receiving an "M1" (or primary master converter) designation at its role designating input. Again, the "M1" designation indicates that the corresponding power converter 102*a* is a master power converter in the context of the overall system 100.

The select and load circuit 110*a* has a command input that is connected to the shared command bus 112 (CMD_BUS) via the command input buffer 118*a*.

The select and load circuit 110*a* has a first output that is connected to the control signal input of the power control circuit 106*a*, a second output that is connected to the control input of the regulator circuit 108*a*, and a third output that is connected to a control input of the command output buffer 116*a*.

The command output buffer 116*a* has an input that is connected to an output of the regulator circuit 108*a*, and an output that is connected to the command output of the power converter 102*a* and to the shared command bus 112 (CMD_BUS). The command output buffer 116*a* also has a control terminal that is connected to an output from the select and load circuit 110*a*.

The command input buffer 118*a* has an input that is connected to the command input of the power converter 102*a* and to the shared command bus 112 (CMD_BUS), and an output that is connected to an input of the select and load circuit 110*a*.

The output isolation diode 114*a* has an input that is connected to the output of the power stage 104*a*, and an output that is connected to the main output of the power converter 102*a*.

The other power converters 102*b*, 102*c*, . . . 102*n* in the illustrated system 100 are structurally identical to power converter 102*a*.

In the illustrated system, power converter 102*a* is designated as the primary master power converter ("M1") for the system 100, power converter 102*b* is designated as the secondary or backup master power converter ("M2"), and the other power converters 102c, . . . 102n are designated as slave power converters ("S"). These functions are indicated by the "M1" designation in power converter 102a, the "M2" designation in power converter 102b, and the "S" designation in power converters 102c through 102n. The designations "M1", M2" and "S" are derived by decoding the address inputs ADRS_1, ADRS_2, ADRS_3 . . . ADRS_n inputs to the select and load functions, 110a, 110b, 110c, . . . 110n.

At a high level, therefore, in the illustrated implementation, power converter 102a (the primary master converter) operates to produce a current command signal (CMD_1) that it outputs to the shared command bus 112.

Absent a failure or shut down in power converter 102a, for example, the operation of all the other converters 102b, 102c, . . . 102n in the system 100 is controlled or influenced by the current command signal (CMD_1) from power converter 102a. Additionally, regulator 108b tracks what regulator 108a is doing to produce current command signal (CMD_1) so that, if power converter 102a fails or otherwise ceases to operate properly, power converter 102b can take over master converter functionalities for the system 100. Of course, if power converter 102a does fail or cease to operate properly, power converter 102b does take over master controller functionalities for the system 100, including producing a current command signal (CMD_2) to influence or command the behavior of any other, still operational, power converters (e.g., 102c, . . . 102n) in the system 100.

Turning now to the specific operational functionalities of power converter 102a (i.e., the primary master converter in the system 100), at a high level, when the system 100 is operational, in power converter 102a, power stage 104a is operable to convert its input voltage VIN_1 to an output voltage VOUT_1. The output voltage VOUT_1 is passed through the output isolation diode 114a to the main output of the power converter 102a.

The regulator circuit 108a monitors the output voltage VOUT_1 of the power stage 104a. Based on that monitoring, the regulator circuit 108a produces a current command signal CMD_1, which it sends to shared command bus 112 via output buffer 116a to control and/or influence the behavior of all the parallel connected power converters 102a, 102b, 102c, . . . 102n in the system 100. If, for example, there is a dip in the output voltage VOUT_1, suggesting a rapid increase in load on the system 100, the regulator circuit 108a may produce a current command signal CMD_1 that causes all of the power converters 102a, 102b, 102c, . . . 102n in the system 100 to, boost the amount of current being produced.

Incidentally, the select and load circuit 110a in power converter 102a allows or instructs the regulator circuit 108a and the output buffer 116a to deliver the current command signal CMD_1 to the shared command bus 112. It does this because power converter 102a is designated as the primary master converter, as indicated by the "M1" signal at the select and load circuit 110a.

The current command signal CMD_1 is placed by the power converter 102a onto the shared command bus 112. The current command signal CMD_1 then reenters the power converter 102a from the shared command bus 112 via the input buffer 118a. After passing through the input buffer 118a, the current command signal CMD_1 arrives at the select and load circuit 110a. The select and load circuit 110a uses this current command signal CMD_1 to produce the command CURR_1 for the power control circuit 106a.

The power control circuit 106a uses the command CURR_1 to control or influence the behavior of the power stage 104a. In particular, in a typical implementation, the power control circuit 106a may instruct the power stage 104a how much current to produce at its output.

Power converter 102b in the illustrated implementation is the system's secondary or backup master converter. Therefore, its behavior depends, in part at least, on whether power converter 102a (i.e., the primary master converter) is operational or not.

First, we consider the situation where the primary master converter (102a) is operational. In that situation, the secondary master converter (i.e., 102b in FIG. 1) acts essentially like a slave converter. Thus, when the system 100 is operational, in power converter 102b, power stage 104b is operable to convert its input voltage VIN_2 to an output voltage VOUT_2. The output voltage VOUT_2 is passed through the output isolation diode 114b to the main output of the power converter 102b.

The regulator circuit 108b monitors the output voltage VOUT_2 of the power stage 104b. Based on that monitoring, and the buffered CMD_1 signal received from the data bus via buffer 118b and select and load function 110b, the regulator circuit 108b may (and does in the illustrated implementation) produce a current command signal CMD_2 that is identical to CMD_1. However, since power converter 102b is only the secondary (and not the primary) master converter and since the primary master converter (102a) is operational, current command signal CMD_2 from the regulator circuit 108b in the secondary master converter is not passed out to the shared command bus 112. Instead, in the illustrated implementation, the command output buffer 116b blocks the current command signal CMD_2 from reaching the shared command bus 112. In a typical implementation, the select and load circuit 110b provides the signal that causes this blocking behavior by the output buffer 116b. This signal is provided to the control terminal (EN) on the command output buffer 116b.

The current command signal CMD_1 from the primary master controller enters the power converter 102b from the shared command bus 112 via input buffer 118b. After passing through the input buffer 118b, the current command signal CMD_1 arrives at the select and load circuit 110b and the select and load circuit 110b uses this current command signal CMD_1 to produce a control signal CURR_2 for power control circuit 106b.

Power control circuit 106b uses this control signal CURR_2 to control or influence the behavior of the power stage 104b. In particular, in a typical implementation, the power control circuit 106b may instruct the power stage 104b as to how much current the power stage 104b should be producing at its output based on control signal CURR_2.

Next, we consider the situation where the primary master converter (102a) is not operational (e.g., has failed in service). In that situation, the secondary master converter (i.e., 102b in FIG. 1) takes over the role of primary master converter for the system 100. Moreover, in that situation, the secondary master converter would function or behave exactly, or at least substantially, like the primary master converter did before it ceased operating properly (as discussed above).

If the primary master converter (102a), for example, fails or ceases to operate properly, and it stops producing voltage at its main output, isolation diode 114a prevents the backflow of current from the shared command bus 112 into any of the converter subcomponents.

Turning now to the specific operational functionalities of power converter 102c (i.e., a typical one of perhaps many slave converters in the system 100), at a high level, the behavior of power converter 102c is controlled or influenced by the whichever other power converter is acting as the master converter for the system 100 at any particular point in time.

So, when the system 100 is operational, in power converter 102c, power stage 104c is operable to convert its input voltage VIN_3 to an output voltage VOUT_3. The output voltage VOUT_3 is passed through the output isolation diode 114c to the main output of the power converter 102c.

The regulator circuit 108c monitors the output voltage VOUT_3 of the power stage 104c. Based on that monitoring, the regulator circuit 108c may (and does in the illustrated implementation) produce a current command signal CMD_3. However, since power converter 102c is a slave converter, current command signal CMD_3 from the regulator circuit 108c in the slave converter (102c) does not pass out to the shared command bus 112. Instead, in the illustrated implementation, the command output buffer 116c blocks the current command signal CMD_3 from reaching the shared command bus 112. In a typical implementation, the select and load circuit 110c provides the signal that causes this blocking behavior by the output buffer 116c. This signal is provided to the control terminal (EN) on the command output buffer 116c.

In the illustrated implementation, the current command signal CMD_1 from the primary master controller enters the power converter 102c from the shared command bus 112 via input buffer 118c. After passing through the input buffer 118c, the current command signal CMD_1 arrives at the select and load circuit 110c and the select and load circuit 110c uses this current command signal CMD_1 to produce a control signal CURR_3 for power control circuit 106c.

Power control circuit 106c uses this control signal CURR_3 to control or influence the behavior of the power stage 104c. In particular, in a typical implementation, the power control circuit 106c may instruct the power stage 104c as to how much current the power stage 104c should be producing at its output based on control signal CURR_3.

During system operation, in a typical implementation, the single data bus carries one command signal from a particular one of the power converters (e.g., 102a) that is acting as the master power converter to all of the other parallel-connected power converters (e.g., 102b, 102c, . . . 102n) in the system 100, each of which uses that command signal to control its contribution to total system 100 output current.

Figure 6:
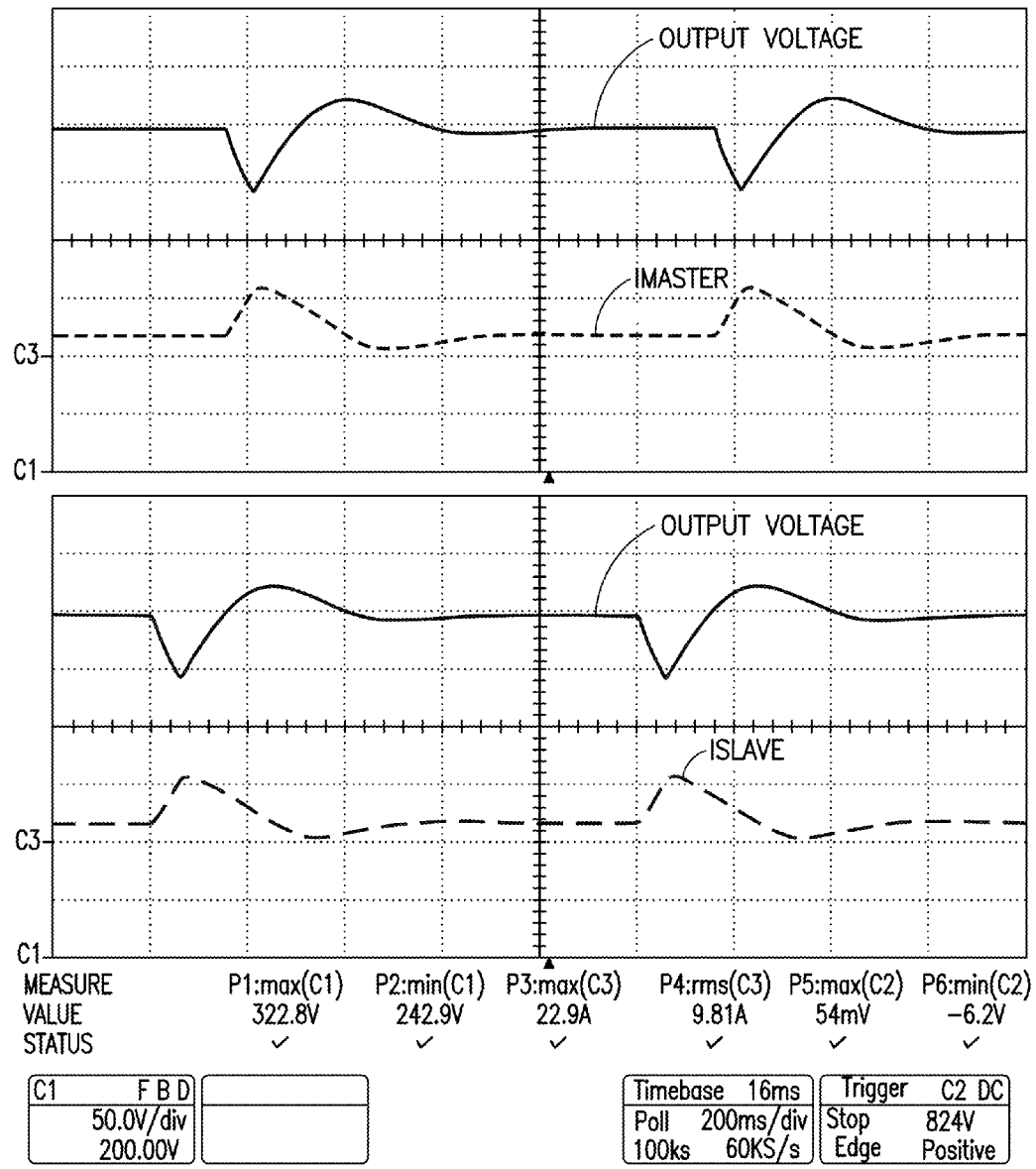
FIG. 6 shows oscillograms of two converters sharing current.

In a typical implementation, the system 100 advantageously is able to maintain a regulated output voltage despite variations in input voltage/current or load voltage/current. Moreover, the system 100 is able to control the output current from each respective one of the power converters 102a, 102b, 102c, . . . 102n so they share the total load current equally. The system 100 has a very good load sharing transient response, particularly as compared to prior art parallel-connected power converter systems. In this regard, FIG. 6 shows exemplary oscillograms that represent two converters sharing current according to an exemplary implementation of the technology and techniques disclosed herein.

Moreover, in some implementations, particularly where there is a designated secondary or backup master converter (e.g., 102b in FIG. 1), the system 100 has built-in redundancy, so that failure of a master converter (e.g., 102a in FIG. 1), or any one of the other parallel-connected power converters, can be tolerated as long as there is sufficient current capacity available from the remaining power units. Moreover, in a typical implementation, effective load sharing can be achieved among the multiple parallel connected power converters 102a, 102b, 102c, . . . 102n without necessarily having a separate control system external to the power converters.

Figure 2:
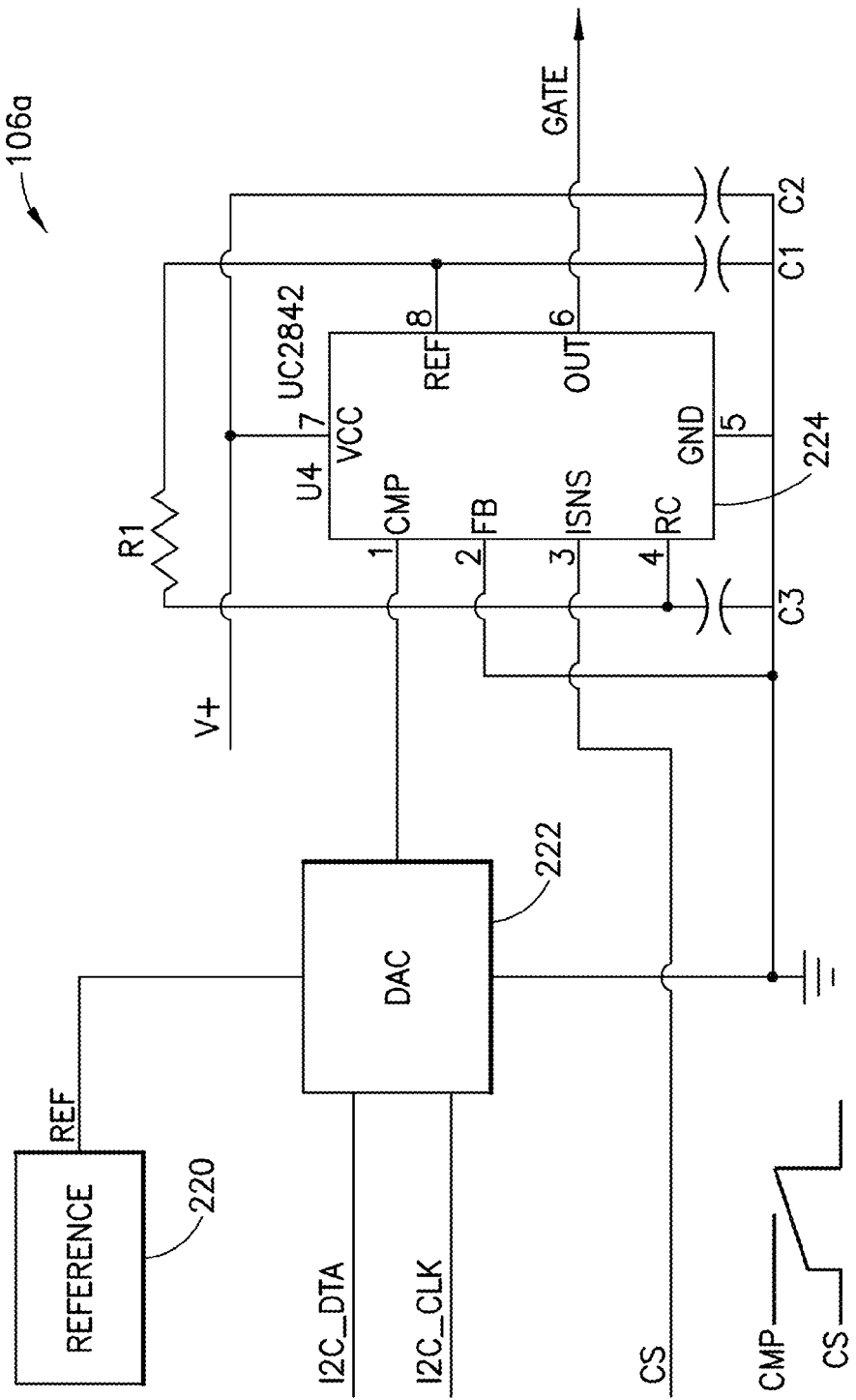
FIG. 2 is a schematic representation showing one exemplary implementation of the power control circuit from the power supply system of FIG. 1.

FIG. 2 is a schematic representation showing one exemplary implementation of power control circuit 106a. The power control function represented by the power control circuit 106a generally takes a digital word input, (e.g., generically CURR_X, specifically one of CURR_1, CURR_2, CURR_3 . . . ) and uses it to control the output current of its associated power stage (e.g., 104a). Any appropriate means may be employed. One common means is pulse width modulation using peak current mode control. The digital input word CURR_X is converted to an analog voltage that is used to set the peak switching current in a primary winding of a transformer in the power stage (e.g., 104a).

The illustrated power control circuit 106a has a reference voltage source 220, a digital-to-analog converter 222, and a pulse width modulator controller 224. The power control circuit 106a is generally operable to receive a control signal (i.e., CURR_1) from the select and load circuit 110a, and to control or influence the behavior of the power stage 104a of the power converter 102a based on that control signal CURR_1. In this regard, the control signal CURR_1 arrives at the power control circuit 106a on a data line of an I2C interface, and the output (GATE) of the power control circuit 106a interfaces with the power stage 104a of the power converter 102a.

In a typical implementation, the power stage 104a has switching elements (e.g., MOSFETs) that help convert the input voltage VIN_1 to the output voltage VOUT_1, and the power control circuit 106a acts to control or influence the associated switching operations at the power stage 104a to help regulate the output voltage VOUT_1.

The reference voltage source 220 can be virtually any kind circuit that is able to produce a fixed (constant) voltage generally irrespective of loading, power supply variations, temperature changes, passage of time, etc. The reference voltage source 220 in the illustrated implementation has an output that is connected to the digital-to-analog converter 222.

The digital-to-analog converter 222 can be any one of a variety of different kinds of circuit that converts a digital signal (e.g., CURR_1) to an analog one (e.g., an analog signal suitable to control switching circuitry (e.g., MOSFETS) in the power stage 104a of the power converter 102a). The digital-to-analog converter 222 in the illustrated implementation has an I2C interface, with a data input where it may receive the CURR_1 control signal from the select and load circuit 110a, and a CLK input where it may receive a clock signal input. The digital-to-analog converter 222 has an input to receive the reference voltage (REF) from the reference voltage source 220. The digital-to-analog converter 222 has a connection to ground. The digital-to-analog converter 222 has an output that is connected to one of the terminals (CMP) on the pulse width modulator controller 224. Generally speaking, the output of the digital-to-analog converter 222 is an analog voltage that represents the reference voltage (REF) having been scaled by the digital value of CURR_1.

The pulse width modulator controller 224 can be any one of a variety of different controllers for a pulse width modulator. In the illustrated implementation, the pulse width modulator controller 224 is a model UC2842 current-mode pulse width modulation controller, available, for example, from Texas Instruments. Of course, it may be feasible to use other types of pulse width modulator controllers instead of the model UC2842 controller.

The illustrated pulse width modulator controller 224 has eight pins: CMP, FB, ISNS, RC, GND, OUT, VCC and REF. The CMP pin is an error amplifier compensation pin. The FB pin is an inverting input to an internal error amplifier. The ISNS pin is a primary-side current sense pin. The RC pin is a fixed frequency oscillator set point connection. The GND pin is for a ground connection. The OUT pin is an output pin that may provide a gate drive signal for external MOSFET(s) (e.g., in power stage 104*a*). The VCC pin is an analog controller bias input for providing power to the device. The REF pin is a reference voltage.

As mentioned above, the CMP pin is connected to the analog output of the digital-to-analog converter 222. It is a characteristic of the model UC2842 controller that the CMP has a weak pull-up that can be easily overridden by a low impedance voltage source; the illustrated digital-to-analog converter 222 has such an output, therefore, the voltage present at the CMP pin is the output of the digital-to-analog converter 222. The inverting error amplifier input FB is connected to ground so that the error output CMP defaults to a high state. The ISNS pin is connected to a current sensing signal CS that may be derived from a pulse current flowing in the primary winding of a converter transformer (e.g., in power stage 104*a*). The power switch in the power stage 104*a*, typically a metal-oxide-semiconductor field-effect-transistor ("MOSFET"), is turned on until the signal CS reaches the voltage established on the CMP pin, at which time the power switch is turned off until the beginning of the next switching cycle. In a typical implementation, the converter output current is directly proportional to the peak transformer primary current. The circuit, therefore, provides a method of setting the converter output current in response to a digital command (e.g., CURR_1). The RC pin is connected through a resistor (i.e., timing resistor R1) to the REF pin, and to a capacitor (i.e., timing capacitor C3), whose opposite terminal is grounded. Generally speaking, the timing resistor (e.g., R1) to the REF pin and the timing capacitor C3 set the operating frequency of the pulse width modulator. The GND pin is connected to ground. The OUT pin is connected to a gate of the switching circuitry in the power stage 104*a*. The VCC pin is connected to a voltage source (V+) and to decoupling capacitor C2, whose other terminal is connected to ground. The REF pin is connected to timing resistor R1 and to decoupling capacitor C1 whose other terminal is connected to ground. During system 100 operations the voltage reference source 220 generates a stable voltage REF for the digital-to-analog converter 222. The pulse width modulator controller 224 modulates the pulse widths of its output based on comparing signal CS with the CM' output of the pulse width modulator controller.

Figure 3:
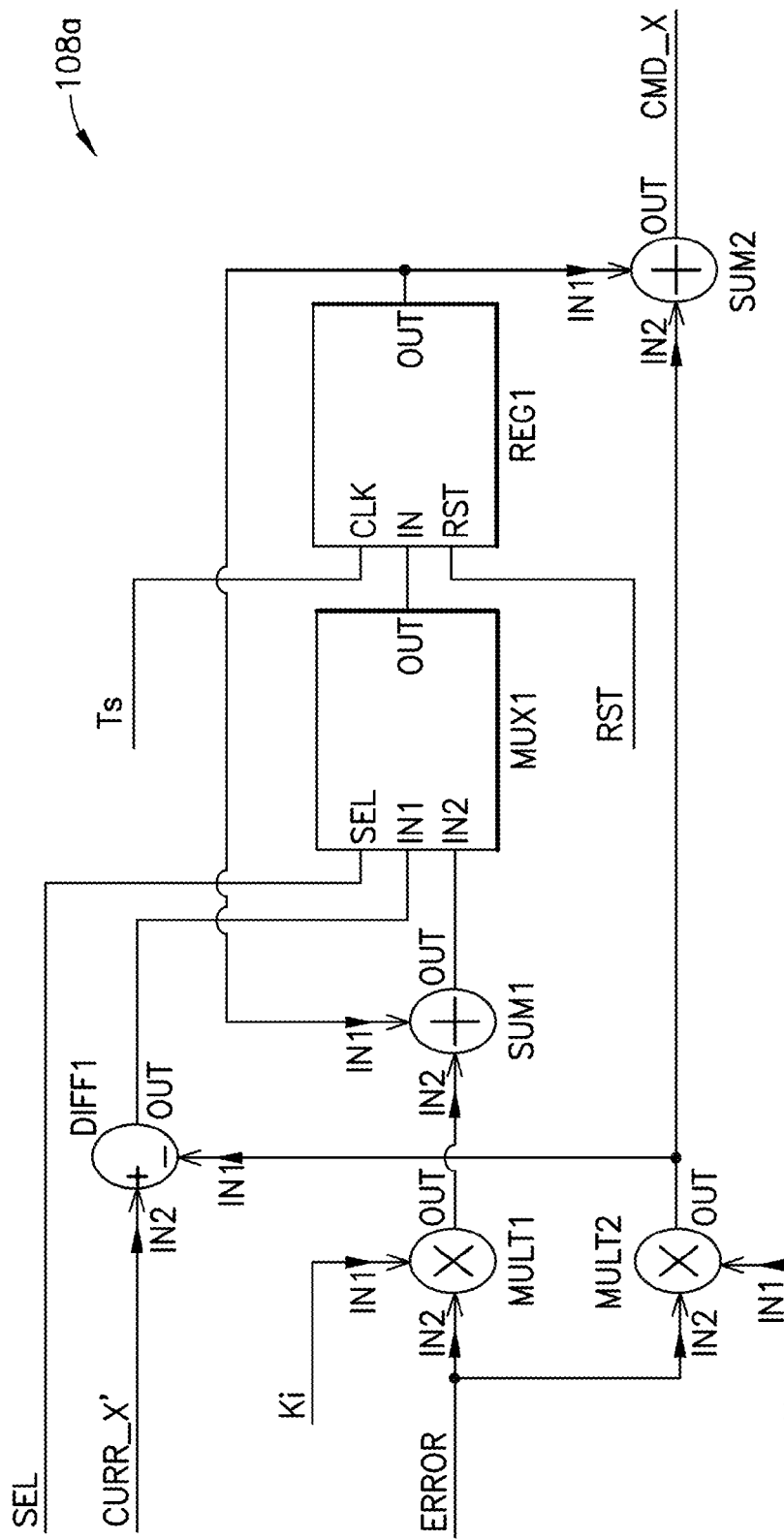
FIG. 3 is a schematic representation showing one exemplary implementation of the regulator circuit from the power supply system of FIG. 1.

FIG. 3 is a schematic representation of an exemplary regulator circuit 108*a*.

According to the illustrated implementation, the regulator circuit 108*a* has two multipliers (MULT1 and MULT2), two adders (SUM1 and SUM2), a subtractor DIFF1, a multiplexer MUX1 and a register REG1. The inputs to the portion of the regulator circuit 108*a* shown include a select signal SEL, a command signal CURR_X', which is a modified version of current command signal CMD_X that is received at the power converter (modified in the select and load circuit), and an error signal ERROR, which may have been derived by comparing the output voltage VOUT_1 of the power stage 104*a* to a reference voltage. The output of the portion of the regulator circuit 108*a* shown is current command signal CMD_X (e.g., CMD_1 in 102*a*).

The first multiplier MULT1 is configured to multiply the error signal ERROR by an integral gain coefficient Ki. The output of the first multiplier MULT1 is one of the inputs to the first adder SUM1.

The second multiplier MULT2 is configured to multiply the error signal ERROR by a proportional gain coefficient Kp. The output of the second multiplier MULT2 is subtrahend of the subtractor DIFF1, and is one of the inputs to the second adder SUM2.

The first adder SUM1 is configured to add the output of the first multiplier MULT1 to the output of the register REG1. The output of the first adder SUM1 is connected to the second inputs IN2 of the multiplexer MUX1.

The second adder SUM2 is configured to add the output of the second multiplier MULT2 to the output of the register REG 1. The output of the second adder SUM2 is the output of the regulator 108*a* (current command signal CMD_X), which may be sent out to the shared command bus 112, via the command output buffer 116*a*.

The subtractor DIFF1 is configured to subtract the output of the second multiplier MULT2 (the subtrahend) from the command signal CURR_X' (the minuend). The output of the subtractor DIFF1 is connected to the first input IN1 of the multiplexer MUX1.

The multiplexer MUX1 has two input terminals (IN1 and IN2), one select terminal SEL, and one output terminal OUT. In general terms, the multiplexer MUX1 is configured to forward a signal from a selected one of its input terminals (IN1 or IN2) to its output terminal OUT, where the selection is made based on the signal at its select terminal SEL. The first input terminal IN1 of multiplexer MUX1 is connected to the output of the subtractor DIFF1. The second input terminal of multiplexer MUX1 is connected to the output of the first adder SUM1. The select terminal SEL of the multiplexer MUX1 is connected to the select signal input for the regulator circuit 108*a*. The output terminal OUT of the multiplexer MUX1 is connected to an input terminal IN on the register REG1.

The register REG1 has an input terminal IN, a clock signal terminal CLK, a reset terminal RST, and an output. The input terminal IN of the register REG1 is connected to the output OUT of the multiplexer MUX1. The clock terminal CLK of the register REG1 is connected to a timing signal source Ts. The reset terminal RST is connected to a reset signal source RST. The output OUT of the register REG1 is connected to one of the inputs of the second adder SUM2 and is fed-back to one of the inputs of the first adder SUM1.

In the illustrated arrangement, MULT1, SUM1, REG1, MULT2, and SUM2, act as a proportional-integral type controller (control loop) when the select signal SEL at the multiplexer MUX1 causes the multiplexer MUX1 to transmit the signal at IN2 of the multiplexer MUX1 to its output port OUT. In general terms, a proportional-integral type controller (or control loop) typically continuously calculates an error value (e.g., ERROR in FIG. 3) as a difference between a desired set point (e.g., a desired output voltage) and a measured process variable (e.g., VOUT_1) and applies a correction based on proportional and integral terms (Kp and Ki), respectively. In a typical implementation, although every power converter in the system may have its own PI loop, only one such loop may be active at any one time.

The output of a proportional-integral controller may be given by $$K_P \Delta + K_I \int \Delta dt$$

where Δ is the error or deviation of actual measured value (e.g., VOUT_1) from the set point or desired value.

In FIG. 3, MULT2 produces the KpΔ term, MULT1, SUM1 and REG1 produce the $K_i \int \Delta dt$ term, and SUM2 produces $Kp\Delta + K_i \int \Delta dt$, which, in FIG. 3 is current command signal CMD_X.

During system operation, the error input ERROR is sampled, typically at a fixed rate, and multiplied by loop constants Ki and Kp. The first adder SUM1 and the register REG1 form an integrator that accumulates successive values of its input by clocking new values into REG1 with signal Ts, typically at a regular rate. The outputs of the integrator and the Kp multiplier are added by the second adder SUM2 to produce a digital value for the current command signal CMD_X.

In the illustrated implementation, the arrangement allows for loading the integrator register with an external value. In a typical implementation, only one PI loop of the multiple power converters 102a, 102b, 102c, . . . 102n in the system 100 is active at any one time. If the system 100 has built-in redundancy, then a back-up up PI loop (e.g., the one in the secondary master converter, i.e., power converter 102b in FIG. 1) stands by for the PI loop of the master converter. The back-up PI loop, therefore, should be ready to take over from, the PI loop of the primary master converter (i.e., 102a in FIG. 1). This take over may be accomplished by asserting an appropriate select signal SEL at the select terminal SEL of the multiplexer MUX1 of the secondary master converter (e.g., 102b) to allow the output of the subtractor DIFF1 to be loaded into the register REG1 in accordance with the timing signal Ts. As mentioned elsewhere herein, CURR_X' is a modified version of the current command signal CMD_X (e.g., CMD_1) that is received from the shared command bus 112. The output of the second multiplier MULT2 is subtracted from CURR_X' before it is loaded into the register REG1, so that current command signal CMD_X equals CURR_X' when the output of the second multiplier MULT2 is added back by the second adder SUM2. In a typical implementation, this helps ensure that the transition between a PI loop in a primary master converter (e.g., 102a in FIG. 1) and a PI loop in a secondary master converter is seamless.

Figure 4:
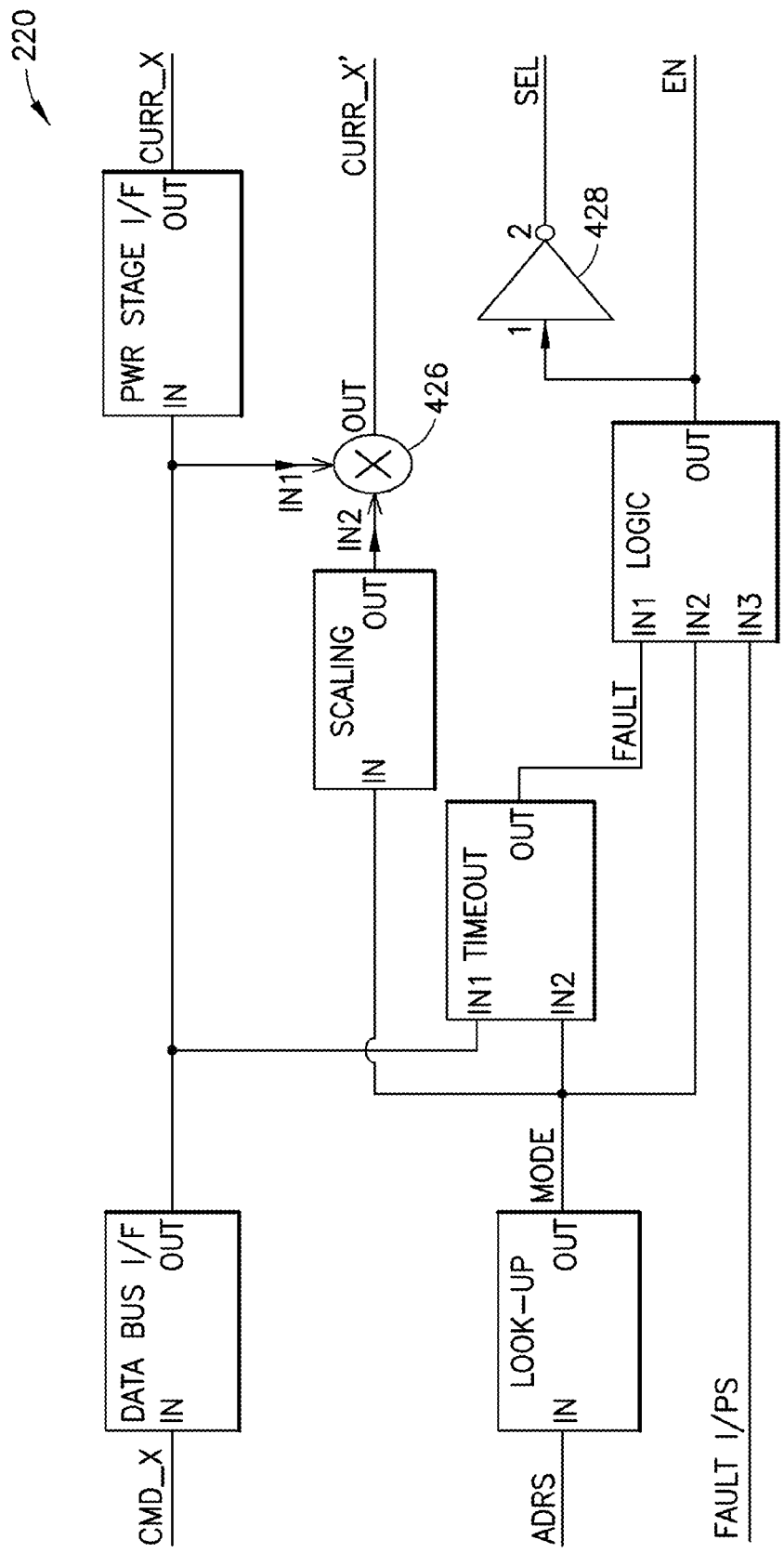
FIG. 4 is a schematic representation showing one exemplary implementation of the select and load circuit from the power supply system of FIG. 1.

FIG. 4 is an exemplary implementation of select and load circuit 110a.

According to the illustrated implementation, the select and load circuit 110a has a data bus interface DATA BUS I/F, a power stage interface PWR STAGE I/F, a look-up table LOOK-UP, a timeout circuit TIMEOUT, a scaling circuit SCALING, a multiplier 426, a logic circuit LOGIC, and a NOT logic gate 428. The select and load circuit 110a, in the illustrated implementation, has three inputs: the current command signal CMD_X signal that comes from the shared command bus 112, via a command input buffer, a digital address ADRS (of sufficient bits to uniquely identify each converter in the system), and a fault signal FAULT I/PS. The select and load circuit 110a outputs the signals (CURR_X and CURR_X'), a select signal SEL (for regulator circuit, e.g., 108a), and an enable signal EN (for the command output buffer, e.g., 116a).

The data bus interface DATA BUS I/F has an input terminal IN to receive the current command signal CMD_X, and an output terminal OUT. The input terminal IN of the data bus interface DATA BUS I/F is connected to receive the current command signal CMD_X. The output terminal OUT of the data bus interface DATA BUS I/F is connected to an input terminal IN of the power stage interface PWR STAGE I/F, the first input terminal IN1 of the timeout circuit TIMEOUT, and to one of the inputs to the multiplier 426.

The power stage interface PWR STAGE I/F has an input terminal IN and an output terminal OUT. The input terminal IN of the power stage interface PWR STAGE I/F is connected to the output terminal of the data bus interface DATA BUS I/F. The output terminal OUT of the power stage interface PWR STAGE I/F is connected to the power control circuit (e.g., 106a).

The look-up circuit LOOK-UP has an input terminal IN and an output terminal OUT. The input terminal IN of the look-up circuit LOOK-UP is connected to receive the address signal ADRS. The output (MODE) of the look-up LOOK-UP is connected to an input terminal IN on the scaling circuit, to the second input IN2 of the timeout circuit TIMEOUT and to a second input IN2 of the logic circuit LOGIC.

The scaling circuit SCALING has an input IN and an output OUT. The input of the SCALING circuit is connected to the output OUT of the look-up LOOK-UP. The output OUT of the scaling circuit SCALING is connected to an input of the multiplier 426.

The timeout circuit TIMEOUT has two inputs (IN1 and IN2) and one output OUT. The first input IN1 of the timeout circuit TIMEOUT is connected to the output OUT of the data bus interface DATA BUS I/F. The second input IN2 of the timeout circuit TIMEOUT is connected to the output OUT of the look-up circuit LOOK-UP. The output OUT of the timeout circuit TIMEOUT is connected to a first input terminal IN1 of the logic circuit LOGIC. The output signal of the timeout circuit TIMEOUT is a fault signal FAULT.

The multiplier 426 has a pair of inputs and a single output. The output of the multiplier 426 is signal CURR_X'.

The logic circuit LOGIC has three inputs (IN1, IN2, and IN3) and one output OUT. The first input IN1 of logic circuit LOGIC is connected to the output OUT of the timeout circuit TIMOUT. The second input IN2 of logic circuit LOGIC is connected to the output OUT of the look-up circuit LOOK-UP. The third input IN3 of the logic circuit LOGIC is connected to receive the FAULT I/PS signal. The output OUT of the logic circuit is the enable signal EN for the command output buffer (e.g., 116a), and also is connected to an input of the NOT logic gate 428.

The NOT logic gate 428 has an input and an output. The input of the NOT logic gate 428 is connected to the output OUT of the logic circuit LOGIC. The output of the NOT logic gate 428 is the select signal SEL for the regulator circuit (e.g., 108a).

As mentioned above, in a typical implementation, the digital address ADRS is of sufficient bits to uniquely identify each converter in the system. The mode designations (e.g., M1, M2, S, etc.) may then be assigned to different converter addresses (e.g., by firmware running in a microcontroller that is contained within the select and load circuit 110a) so that all converters in the system 100 may be identical in form and function.

The data bus interface DATA BUS I/F, in a typical implementation, is an interface block that is adapted to covert the shared command bus 112 format into a form that a microcontroller executing the select and load functionalities, for example, can process. Similarly, the power stage interface PWR STAGE I/F is an interface block that is adapted to convert data from the select and load circuit format that is suitable for transmission (e.g., via an I2C or SPI bus, or other format) to and/or interfacing with the digital-to-analog converter 222 (of FIG. 2, for example).

Another function of the select and load circuit 110a is to scale the value of current command signal CMD_X to produce signal CURR_X', which may be used to update the integrator register represented in FIG. 3. A secondary or backup master converter (e.g., 102b in FIG. 1) knows that, if it is called on to assume the role of master, one converter in the system 100 has failed and that, therefore, each surviving converter will be required to deliver more current than was the case before the failure. It is therefore prudent and, in a typical implementation this is done, to scale current command signal CMD_X before it is loaded into the integrator register in anticipation of a failure to ensure that the transition is seamless.

If, for example, there are K functional power converters in a system before any of the converters fail, and one of the converters does fail, then there will be K−1 functional converters after that failure. In that situation, the secondary or backup master converter typically will increase the value of current command signal CMD_X by a factor of K/(K−1) to generate CURR_X'. A system controller will update the value of K in the converters as failures occur so that the factor K/(K−1) is always correct when a new failure occurs.

The LOGIC block typically receives inputs from built-in test circuits within the converter in an attempt to discover when the converter becomes faulty. In the event that a fault is discovered, the converter will disable itself and inhibit further activity on the shared command bus 112, and allow another master (e.g., the secondary or backup master converter) to take over, if the system has redundancy.

There are at least two ways in which the failure of a primary master converter may be determined so that a secondary or back-up master converter may assume control of the shared command bus 112: the primary master converter may inform the secondary or backup master converter that it has failed, or the secondary or backup master converter may determine autonomously that the primary master converter has failed. The schematic representation in FIG. 4 represents the latter of these two approaches.

In FIG. 4, the input word connects to a timeout function that detects when an expected message from the data bus 112 fails to arrive. In a typical implementation, the duration of the timeout may depend on the mode of the converter. A secondary (i.e., first back-up) master converter may have a timeout duration just long enough to determine that the primary master converter has not sent a message, taking into account tolerances in the system 100, and if the timeout expires, the logic block LOGIC will assert EN and de-assert SEL so that it becomes the new master. In a typical implementation, a tertiary (i.e., second back-up) master converter may run a timeout longer than the secondary (i.e., first back-up) master converter to allow time for the secondary (i.e., first back-up) master converter to respond if the primary master converter fails, and so on for additional master converters.

Figure 5:
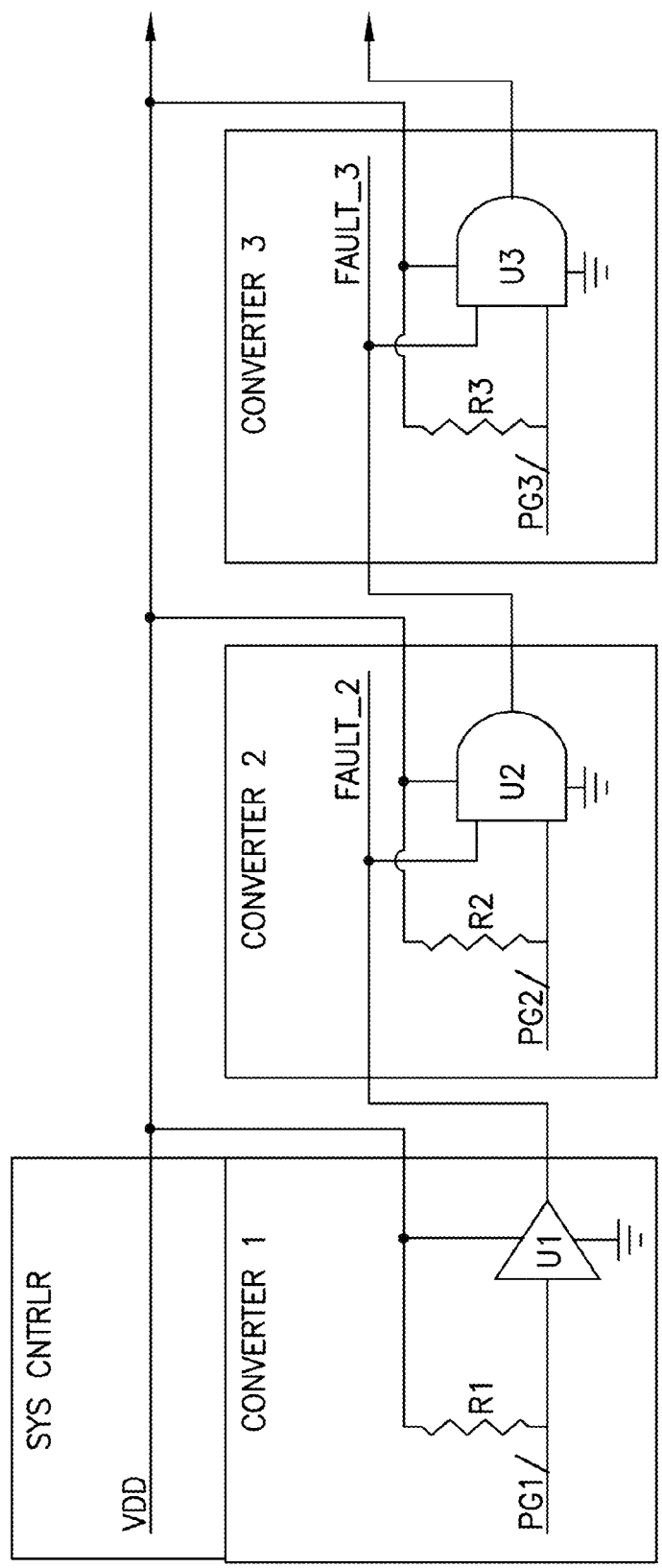
FIG. 5 is a schematic representation showing an exemplary scheme for determining a primary master converter failure in the power supply system of FIG. 1.

FIG. 5 is a schematic representation of an exemplary alternative method of determining a primary master converter failure.

The illustrated implementation includes a system controller SYS CNTRLR, a first converter CONVERTER 1, a second converter CONVERTER 2, and a third converter CONVERTER 3. The system controller provides an uninterruptible signal VDD that is made available to each of the converters (e.g., CONVERTER 1, CONVERTER 2 and CONVERTER 3). Moreover, each power converter is able to monitor its own health and generates a power good signal, designated PG1/, PG2/, etc. in the illustrated implementation.

The first converter CONVERTER 1 has a logic circuit therein that includes a first logic gate U1 (a non-inverting buffer) and a resistor R1. The first logic gate U1 has a main input, a control input, an output and a ground connection. The uninterruptible signal VDD is provided to the control input of the first logic gate U1 and to a first end of the resistor R1. The opposite end of the resistor is connected to the low-true power good signal PG1/. The power good signal PG1/is provided as an input to the first logic gate U1. The output of the first logic gate U1 is provided as a fault signal FAULT 2 to the second converter CONVERTER 2.

The second converter CONVERTER 2 has a logic circuit therein that includes a second logic gate U2 (an AND gate) and a resistor R2. The second logic gate U2 has a pair of main inputs, a control input, an output and a ground connection. The uninterruptible signal VDD is provided to the control input of the second logic gate U2 and to a first end of the resistor R2. The opposite end of the resistor is connected to the power good signal PG2/. The power good signal PG2/is provided to a first one of the inputs of the second logic gate U2. The fault signal FAULT 2 is provided to a second one of the inputs of the second logic gate U2. The output of the second logic gate U2 is provided as a fault signal FAULT 3 to the third converter CONVERTER 3.

The third converter CONVERTER 3 is similar to the second converter CONVERTER 2.

According to the illustrated example, each power converter monitors its own health and generates one of the power good signals, designated PG1/, PG2/, etc. The signal may be, for example, an open drain or open collector signal so that it defaults to its false (or high) state in the event of a total loss of power within the power converter. Its pull-up and the interface logic may be powered by an uninterruptible signal VDD as shown, for example, from system controller. The logic shown in each converter may replace the timeout circuit TIMEOUT in FIG. 4, for example, and may generate the FAULT signal of FIG. 4 in its stead.

It is apparent that, if PG1/in the primary master converter (e.g., 102a in FIG. 1) goes false, FAULT_2 in the secondary or backup master converter (e.g., 102b in FIG. 2) will go true and transfer control to the secondary or backup master converter (e.g., 102b in FIG. 2). In some implementations, by OR-ing together the PG/signals in each converter, a priority of succession is established such that a converter will only assume active master status if all its preceding power converters have failed.

In a typical implementation, the shared command bus 112 may be any suitable configuration that avoids contention when a new master wishes to take over from a failed converter. The command bus 112, therefore, may have wire OR capability; an open collector or open drain bus may be more suitable. If more noise immunity or a higher data rate is desired or required, a CAN bus may be used. This is, of course, not a complete list of suitable shared command bus 112 configurations.

A number of embodiments of the invention have been described. Nevertheless, it will be understood that various modifications may be made without departing from the spirit and scope of the invention.

For example, various processing functions or circuits represented in the various figures and/or otherwise described herein including, for example, the processing functions associated with the regulator circuit REGULATOR may be implemented by firmware executed in a microcontroller.

A system may include virtually any number of parallel connected power converters. Some or all of the power converters and/or the system may have components in addition to those specifically described or otherwise indicated herein. The specific combination and interaction of circuit components and functionalities described herein can be modified. More than one power converter in a system may be designated as a secondary or backup power converter if, for example, an N+M redundant system is desired or required. In such systems, any additional secondary or backup master power converters in the system will have different designations (e.g., M3, M4, etc.) so that a priority of succession may be established when a master power converter fails. The select and load function may pass the value CMD_BUS received from the shared command bus directly through to CURR_X output that drives the power control function. In some implementations, only hardware level-shifting and data formatting functions are performed in converting CMD_BUS to CURR_X.

In some implementations, the output isolation diodes may be omitted and replaced by direct connections. This is particularly true if, for example, redundancy is not required or desired.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Moreover, certain concepts are described herein as being performed by circuits. Some or all of these circuits may be physical electrical circuits, for example. However, some of the circuits described may be implemented by software, firmware, etc. operating on one or more processing devices.

In some implementations, for example, the processing of the error signal in the regulator may be implemented as firmware running in a microcontroller.

Some of the operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems or components can generally be integrated together in a single hardware or software product or packaged into multiple hardware or software products.

Furthermore, some of the concepts disclosed herein may take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Other implementations are within the scope of the claims.

What is claimed is:

1. A power supply system comprising:
a plurality of power converters, each power converter having an input and an output, wherein the outputs of the power converters are connected together in parallel to produce a single system output;
a shared command bus coupled to each one of the power converters,
a control loop in a designated one of the power converters for generating a current command signal to be outputted onto the shared command bus,
wherein all of the parallel connected power converters in the power supply system are configured to receive the current command signal from the shared command bus and adjust an amount of electrical current being supplied by that power converter in response to the current command signal, wherein the control loop comprises a proportional-integral control loop, where an output of the proportional-integral controller is the current command signal and is given by:

$$K_P\Delta + K_I \int \Delta dt,$$

where $K_p$ is a proportional gain coefficient, $K_I$ is an integral gain coefficient, and $\Delta$ represents an error between an actual measured voltage at the single system output and a desired voltage at the single system output.

2. The power supply of claim 1, wherein the control loop comprises: a first multiplier, a second multiplier, a first adder, a second adder and a register, wherein the first multiplier, the first adder, and the register are configured to produce the $K_I \int \Delta dt$ term, wherein the second multiplier is configured to produce the $K_p\Delta$ term, and wherein the second adder is configured to produce the $Kp\Delta + K_I \int \Delta dt$.

3. The power supply system of claim 1, wherein each of the power converters has a select and load circuit with a role designating input to receive a signal assigning a particular role for each respective power converter within the system, wherein the role designating input in the power converter that is designated to generate the current command signal is receiving a primary master power converter role designator (M1) signal.

4. The power supply system of claim 3, wherein the role designating input in at least one other power converter in the system is a secondary or backup master power converter role designator (M2).

5. The power supply system of claim 4, wherein the at least one other power converter that is designated as the secondary or backup master power converter in the system is configured to take over responsibility for generating the current command signal if the primary master power converter in the system ceases to operate.

6. The power supply system of claim 5, wherein the role designating input of still another at least one power converter in the system is a slave power converter role designator (S).

7. The power supply system of claim 6, wherein each power converter designated as a slave power converter is configured to adjust the amount of electrical current it is supplying in response to the current command signal.

8. The power supply system of claim 1, wherein each power converter comprises:
a power stage circuit to convert an input voltage to an output voltage;
a regulator circuit;
a command output buffer;
a command input buffer;
a select and load circuit; and
a power control circuit.

9. The power supply system of claim 8, wherein, in the power converter that is designated as a primary master power converter:
the regulator circuit monitors the output voltage of the power stage circuit and produces the current command signal;
the command output buffer allows the current command signal to exit the power converter to the shared command bus;
the select and load circuit causes the command output buffer to allow the current command signal to exit the power converter and enter the shared command bus;
the select and load circuit produces a control signal for the power control circuit, and
the power control circuit controls the power stage based on the control signal from the select and load circuit.

10. The power system of claim 9, wherein, in the power converter that is designated as a secondary or backup master power converter, taking over for the power converter that is designated as the primary master power converter if the power converter that is designated as the primary master power converter fails.

11. The power supply system of claim 8 wherein, in each one of the power converters that is designated as a slave power converter:
the command input buffer allows the current command signal to enter the power converter from the shared command bus;
the select and load circuit produces a control signal for the power control circuit based on the current command signal, and
the power control circuit controls the power stage based on the control signal from the select and load circuit.

12. A method of sharing load among a plurality of power converters, each power converter having an input and an output, wherein the outputs of the power converters are connected together in parallel to produce a single system output, the method comprising:
generating a current command signal in a control loop in a designated one of the power converters;
outputting the current command signal to a shared command bus that is coupled to each one of the power converters;
receiving the current command signal from the shared command bus at all of the parallel connected power converters in the power supply system; and
adjusting an amount of electrical current being supplied by each respective one of the power converters in response to the received current command signal,
wherein the control loop comprises a proportional-integral control loop, and wherein generating the current command signal comprises:
producing an output from the proportional-integral controller given by:

$$K_P\Delta + K_I \int \Delta dt$$

where $K_p$ is a proportional gain coefficient, $K_I$ is an integral gain coefficient, and $\Delta$ represents an error between an actual measured voltage at the single system output and a desired voltage at the single system output.

13. The method of claim 12, wherein the control loop comprises: a first multiplier, a second multiplier, a first adder, a second adder and a register, the method further comprising:
producing the $K_I \int \Delta dt$ term with the first multiplier, the first adder, and the register; and
producing the $K_p\Delta$ term with the second multiplier; and
producing the $Kp\Delta + K_I \int \Delta dt$ with the second adder.

14. The method of claim 12, wherein each of the power converters has a select and load circuit with a role designating input to receive a signal assigning a particular role for each respective power converter within the system, the method comprising:

receiving a primary master power converter role designator (e.g., M1) signal at the role designating input in the power converter that is designated to generate the current command signal;

receiving a slave power converter role designator (e.g., S) at the role designating input of at least one of the other power converters in the system, wherein each the slave power converters is configured to adjust the amount of electrical current it is supplying in response to the current command signal.

15. The method of claim 14, further comprising:

receiving a secondary or backup master power converter role designator (e.g., M2) at the role designating input of still another at least one power converter in the system, wherein any of the power converters that is designated as a secondary or backup master power converter in the system takes over responsibility for generating the current command signal if the primary master power converter in the system ceases to operate.

16. The method of claim 12, wherein each power converter comprises a power stage circuit to convert an input voltage to an output voltage, a regulator circuit, a command output buffer, a command input buffer, a select and load circuit, and a power control circuit, the method further comprising, in the power converter that is designated as a primary master power converter:

monitoring the output voltage of the power stage circuit;
producing the current command signal with the regulator circuit, and;
allowing, with the command output buffer, the current command signal to exit the power converter to the shared command bus;
causing, with the select and load circuit, the command output buffer to allow the current command signal to exit the power converter and enter the shared command bus;
producing, with the select and load circuit, a control signal for the power control circuit, and
controlling, from the power control circuit, the power stage based on the control signal from the select and load circuit.

17. The method of claim 16 further comprising, in the power converter that is designated as a secondary or backup power converter: taking over for the primary master power converter, if the primary master power converter fails.

18. The method of claim 12, wherein each power converter comprises a power stage circuit to convert an input voltage to an output voltage, a regulator circuit, a command output buffer, a command input buffer, a select and load circuit, and a power control circuit, the method further comprising, in any of the power converters designated as a slave power converter:

allowing, with the command input buffer, the current command signal to enter the power converter from the shared command bus;
producing, with the select and load circuit, a control signal for the power control circuit based on the current command signal, and
controlling, with the power control circuit, the power stage based on the control signal from the select and load circuit.

19. A power supply system comprising:

a plurality of power converters, each power converter having an input and an output, wherein the outputs of the power converters are connected together in parallel to produce a single system output;

a shared command bus coupled to each one of the power converters,
a control loop in a designated one of the power converters for generating a current command signal to be outputted onto the shared command bus,
wherein all of the parallel connected power converters in the power supply system are configured to receive the current command signal from the shared command bus and adjust an amount of electrical current being supplied by that power converter in response to the current command signal,
wherein each power converter comprises:
a power stage circuit to convert an input voltage to an output voltage;
a regulator circuit;
a command output buffer;
a command input buffer;
a select and load circuit; and
a power control circuit.

20. The power supply system of claim 19, wherein, in the power converter that is designated as a primary master power converter:

the regulator circuit monitors the output voltage of the power stage circuit and produces the current command signal;
the command output buffer allows the current command signal to exit the power converter to the shared command bus;
the select and load circuit causes the command output buffer to allow the current command signal to exit the power converter and enter the shared command bus;
the select and load circuit produces a control signal for the power control circuit, and
the power control circuit controls the power stage based on the control signal from the select and load circuit.

21. The power system of claim 20, wherein, in the power converter that is designated as a secondary or backup master power converter, taking over for the power converter that is designated as the primary master power converter if the power converter that is designated as the primary master power converter fails.

22. The power supply system of claim 19 wherein, in each one of the power converters that is designated as a slave power converter:

the command input buffer allows the current command signal to enter the power converter from the shared command bus;
the select and load circuit produces a control signal for the power control circuit based on the current command signal, and
the power control circuit controls the power stage based on the control signal from the select and load circuit.

23. A method of sharing load among a plurality of power converters, each power converter having an input and an output, wherein the outputs of the power converters are connected together in parallel to produce a single system output, the method comprising:

generating a current command signal in a control loop in a designated one of the power converters;
outputting the current command signal to a shared command bus that is coupled to each one of the power converters;
receiving the current command signal from the shared command bus at all of the parallel connected power converters in the power supply system; and adjusting an amount of electrical current being supplied by each respective one of the power converters in response to the received current command signal, wherein each power converter comprises a power stage circuit to convert an input voltage to an output voltage, a regulator circuit, a command output buffer, a command input buffer, a select and load circuit, and a power control circuit, the method further comprising, in the power converter that is designated as a primary master power converter:

monitoring the output voltage of the power stage circuit;

producing the current command signal with the regulator circuit, and;

allowing, with the command output buffer, the current command signal to exit the power converter to the shared command bus;

causing, with the select and load circuit, the command output buffer to allow the current command signal to exit the power converter and enter the shared command bus;

producing, with the select and load circuit, a control signal for the power control circuit, and controlling, from the power control circuit, the power stage based on the control signal from the select and load circuit.

24. The method of claim 23 further comprising, in the power converter that is designated as a secondary or backup power converter: taking over for the primary master power converter, if the primary master power converter fails.

25. A method of sharing load among a plurality of power converters, each power converter having an input and an output, wherein the outputs of the power converters are connected together in parallel to produce a single system output, the method comprising:

generating a current command signal in a control loop in a designated one of the power converters;

outputting the current command signal to a shared command bus that is coupled to each one of the power converters;

receiving the current command signal from the shared command bus at all of the parallel connected power converters in the power supply system; and adjusting an amount of electrical current being supplied by each respective one of the power converters in response to the received current command signal, wherein each power converter comprises a power stage circuit to convert an input voltage to an output voltage, a regulator circuit, a command output buffer, a command input buffer, a select and load circuit, and a power control circuit, the method further comprising, in any of the power converters designated as a slave power converter:

allowing, with the command input buffer, the current command signal to enter the power converter from the shared command bus;

producing, with the select and load circuit, a control signal for the power control circuit based on the current command signal, and controlling, with the power control circuit, the power stage based on the control signal from the select and load circuit.

* * * * *